Feb. 24, 1959     R. W. GILBERT     2,874,951
MICRO-BALANCE
Filed May 7, 1956
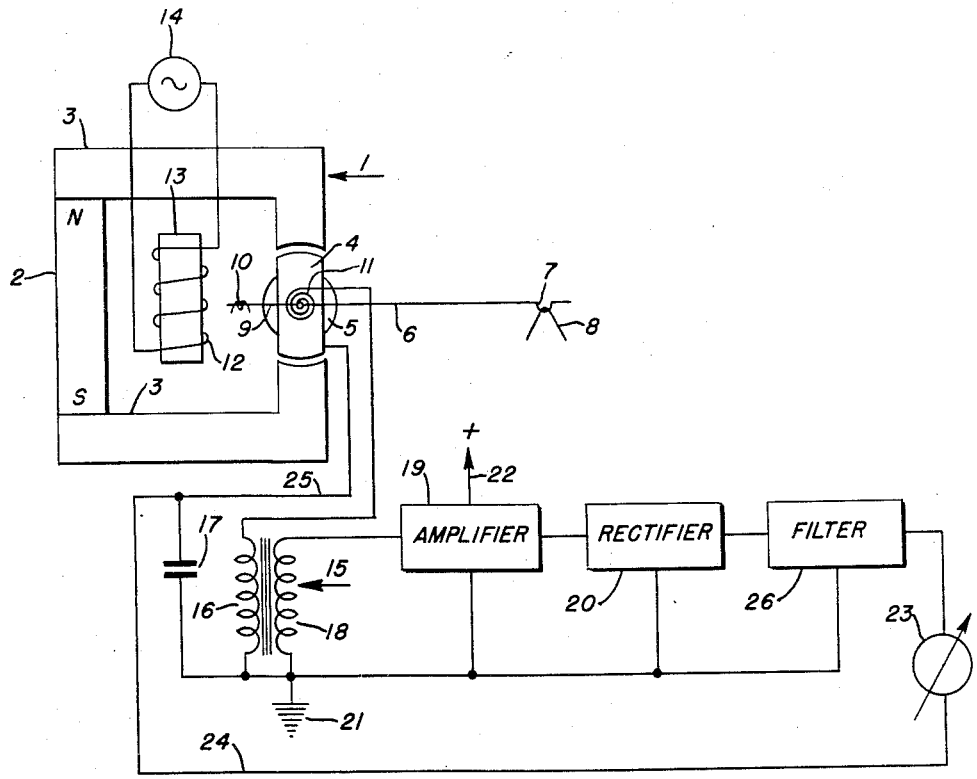
ROSWELL W. GILBERT
INVENTOR.

United States Patent Office 2,874,951
Patented Feb. 24, 1959

2,874,951

MICRO-BALANCE

Roswell W. Gilbert, Montclair, N. J., assignor, by mesne assignments, to Daystrom Incorporated, Murray Hill, N. J., a corporation of New Jersey Application May 7, 1956, Serial No. 583,245

8 Claims. (Cl. 265—70)

This invention relates to an electrical weighing device and more particularly to a torsion type balance wherein the torque produced by an article to be weighed is automatically feedback balanced by means of a torque-producing electrical mechanism.

Electrical torsion type balances as a class are well known, however, all of the present torsion type balances are deficient in one or more aspects. Among others, the deficiencies include excessive drift; inability to make accurate weight measurements; introduction of spurious electrical potentials; and inability to make rapid weight measurements.

Electrical weighing devices of the type contemplated by this invention are generally used in the weighing of light weight articles. The components and attendant circuitry are both simple and economical.

An object of this invention is the provision of a weighing device for accurately and quickly weighing articles.

An object of this invention is the provision of an electrical weighing device which includes a sensitive, feedback balanced A.-C. signal converter wherein the article to be weighed supplies a torque to the converter, and in which incipient deflection is converted to an A.-C. signal, said A.-C. signal being amplified and converted to a D.-C. signal, which D.-C. signal is fed back to the said converter, thereby torque-balancing the converter.

An object of this invention is the provision of an electrical weighing apparatus comprising a permanent magnet having pole pieces for establishing a fixed magnetic flux field, means injecting a cyclically varying component of magnetic flux into the said fixed magnetic flux field, a coil rotatable between said pole pieces, an article supporting lever attached to said coil for applying a torque to the coil in one direction, means applying a D.-C. current to said coil to oppose movement thereof in said one direction, means including an A.-C. potential induced in said coil by reason of said varying component of magnetic flux for regulating said D.-C. current to said coil, and means measuring the amount of D.-C. current applied to the said coil to substantially hold it against movement by the said article, to thereby indicate the weight of the article.

These and other objects and advantages of the invention will become apparent from the following description when taken with the accompanying drawing. It will be understood, however, that the drawing is for purposes of illustration and is not to be construed as defining the scope or limits of the invention, reference being had for the latter purpose to the claims appended hereto.

The single figure of the drawing is a block diagram of my novel weighing device.

Referring to the drawing, reference numeral 1 designates, generally, a sensitive displacement to A.-C. signal converter. The converter comprises a modified induction galvanometer. The operation of an induction galvanometer is described in my United States Patent No. 2,486,641, issued November 1, 1949, and entitled, "Measuring and Control Apparatus," and a preferred construction of such a device is described in my United States Patent No. 2,650,348, issued August 25, 1953, and entitled "Induction Galvanometer." For present purposes it is deemed sufficient to describe a functional construction of the device.

The converter 1 is, essentially, a permanent magnet, movable coil instrument structure but including means for injecting an A.-C. component of magnetic flux into the permanent field flux path. The normal, constant magnetic flux is provided by a permanent magnet 2 having soft-iron pole pieces 3 attached thereto. A wire-wound movable coil 4 is pivotally mounted for rotation about a soft-iron core 5, electrical connection being made to the movable coil by means of conventional hair springs. (The upper such spring 11 is visible in the drawing.) An article supporting lever 6 is fastened by suitable means so as to rotate with the movable coil 4. The article supporting lever 6 is supplied with a bend 7 on which an article 8, shown as a filament, which is to be weighed may be hung. A counter-balance arm 9, which may be formed integrally with the article supporting lever 6, or suitably secured thereto, supports a counter-balance weight 10 which is longitudinally adjustable along the counter-balance arm. In this manner the movable coil 4 may be adjusted for a normal, zero-center position when there is no weight on the article supporting arm 6. A varying magnetic flux field is produced by a coil 12 encircling a core 13, said coil being energized by means of an appropriate high-frequency current source 14. It will be apparent that the movable coil 4 rotates in a magnetic flux gap that includes the steady flux field of the permanent magnet 2 and the varying flux field produced by the coil 12. When the movable coil is in its normal, zero-center position, the A.-C. field flux linkage is zero. However, deflection of the coil 4 by application of an article 8 on the article supporting arm 6 causes the coil to proportionally link the A.-C. component of magnetic flux, and an A.-C. component of potential having a magnitude proportional to the degree of deflection is introduced in the coil. Thus, deflection of the coil in response to a torque applied to the coil will produce an A.-C. potential which can be extracted by the external circuit as by means of a transformer 15.

The solid flux paths normally used in D.-C. instrument structures are not efficient for the high frequency component of flux and conversely, magnetic materials good at high frequencies have permeabilities insufficient for the relatively high level of steady flux from the permanent magnet. It is thus necessary to have a composite magnetic structure including materials individually efficient for both components of the field flux. Such pole structure is disclosed in my above-referenced United States Patent No. 2,650,348.

It may here be pointed out that the use of the modified induction galvanometer in my novel electric weighing device offers design and performance optimums not usual to devices of this type. For example:

(1) The small deflection angle allows concentration of the permanent magnetic field to a high density;

(2) The alternating component of torque reduces friction to an undetectable order, allowing pivot and jewel bearings at sensitivities normally requiring a suspension design; and (3) Electrical cancellation of the torque produced by the filament or other article being weighed provides resolution sensitivity as a function of adjustment rather than as a design limit.

The A.-C. output from the movable coil 4 is applied to the input winding 16 of the transformer 15. A capacitor 17 is included in the transformer input circuit. The capacitor serves to tune the transformer 15 whereby the converter may be adjusted to the point of infinite sensitivity. The transformer A.-C. output is taken from the transformer secondary winding 18 and fed to an amplifier 19. The amplifier output is fed to a rectifier 20 where the A.-C. signal is converted to a D.-C. signal current. The D.-C. signal current is then filtered by use of a filter 26. The amplifier, rectifier and filter have all been shown in block diagram form as the particular circuitry involved in converting the A.-C. signal from the movable coil 4 to a D.-C. signal current is not important to an understanding of my novel electric weighing device. The amplifier, rectifier and filter may be of a conventional design wherein they are all connected to a common ground connection 21 along with the transformer 15 and the movable coil 4; and the amplifier connected to a source of positive potential by means of a lead 22.

The filtered D.-C. signal current from the filter 26 is fed through an ammeter 23 and lead wires 24 and 25 to the movable coil 4; and through the movable coil 4 and transformer input winding 16 to the common ground connection 21. The D.-C. signal current is fed to the movable coil 4 in such a direction so as to oppose the action of the torque produced by the article 8 on the article supporting lever 6. The D.-C. signal current thereby torque-balances the coil 4 so as to maintain the coil at substantially normal, zero-center position at all times regardless of the amount of torque which is applied to the coil. The amount of D.-C. signal current necessary to balance the coil 4 is a measure of the weight of the article 8, therefore, the ammeter 23, through which the D.-C. signal current flows, may be calibrated in terms of weight thereby enabling an operator to read the weight of the article 8 directly on the ammeter.

Certain advantages accrue as a result of using the sensitive torque to A.-C. signal converter in my novel electric weighing device, as described above. The torque to A.-C. signal converter may be operated at a high operating frequency, into the megacycle region if desired; the operating frequency being largely dictated by amplifier considerations. With suitable amplification, reasonably peaked to the operating frequency, feedback periods of the order of milliseconds are readily obtainable. The torque to A.-C. signal converter has an inherently high conversion gain of the order of $10^8$ on an energy basis, and delivers a high amplifier input level. It may be seen then, that by use of my novel weighing device, extremely accurate weight measurements may be obtained. The measurements may be made in a minimum of time as the article supporting lever returns to substantially normal, zero-center position, after application of an article to the article supporting lever, in only several milliseconds, and the operating deflection of the converter is in the order of only a few seconds of angle.

An example of a use for which my novel electric weighing device is particularly well suited is in the weighing of light articles such as filaments which are to be used in incandescent lamps. The weight of the filament per unit length is known; therefore, by weighing a filament of unknown length the length of filament may be determined.

In operation, the filament to be weighed is placed in the bend 7 of the article supporting lever 6. The weight of the filament results in a torque being exerted on the movable coil 4 through the article supporting lever 6. The torque will cause the movable coil to rotate from a normal zero-center position, where the A.-C. field flux linkage is zero, to a position where the A.-C. field flux links with the movable coil. An A.-C. potential is thereby induced in the movable coil, which potential is directly proportional to the degree of rotation of the movable coil. The A.-C. potential is extracted from the movable coil 4 by means of the tuned transformer 15 and thence converted to a D.-C. current by means of the amplifier 19, rectifier 20, and filter 26. The D.-C. current is connected to the movable coil 4 through the ammeter 23 and the lead wires 24 and 25. The D.-C. current in the movable coil reacts with the constant magnetic flux field in such a manner so as to substantially return the movable coil to its normal zero-center position. The amount of D.-C. current which is necessary to balance the moving coil at its normal zero-center position flows through the ammeter 23 and may be read directly thereon in terms of weight.

Having now described my invention, certain changes and modifications in the circuitry will occur to those skilled in the art. While I show an amplifier, rectifier, and filter circuit in block diagram, any suitable means may be used to convert the A.-C. potential, which is extracted from the movable coil, to a D.-C. current which is capable of returning the movable coil to normal, zero-center position. One such means might be by the use of circuitry described in my pending United States Patent Application Serial No. 267,463, filed January 21, 1952, entitled "D.-C. Amplifier," now Patent No. 2,744,168.

The above change may be made without departing from the scope or spirit of the invention as set forth in the following claims.

I claim:

1. An electrical weighing apparatus comprising a composite fixed and varying magnetic flux field, a coil rotatable in said composite fixed and varying magnetic flux field, an article supporting arm attached to said coil for applying a torque to the coil in one direction, means automatically applying a D.-C. current, derived from coil deflection by an article on the said arm, to the said coil to produce a substantially equal and opposite torque, and means measuring the amount of D.-C. current applied to the said coil to hold the coil against substantial movement by the said article, the amount of D.-C. current being a measure of the weight of the article.

2. The invention as recited in claim 1 wherein the means measuring the amount of D.-C. current applied to said coil comprises an ammeter calibrated in terms of weight.

3. An electrical weighing apparatus comprising a permanent magnet having pole pieces for establishing a fixed magnetic flux field, means injecting a varying component of magnetic flux field into the said fixed magnetic flux field, a coil rotatable between said pole pieces, an article supporting lever attached to said coil for applying a torque to the coil in one direction, means automatically applying a D.-C. current, derived from coil deflection by an article on said lever, to said coil to oppose movement thereof in the said one direction, and means measuring the amount of D.-C. current automatically applied to the said coil to substantially hold the coil against movement by the said article to thereby indicate the weight of the said article.

4. An electrical weighing apparatus comprising a composite fixed and varying flux field, a coil rotatable in the said composite fixed and varying flux fields, an article supporting lever attached to said coil for applying a torque to the coil in one direction, means sensing the A.-C. potential induced in the said coil by reason of the said varying flux field, means converting the said A.-C. potential to a D.-C. current, means applying said D.-C. current to said coil to oppose movement thereof in the said one direction, and means measuring the amount of D.-C. current applied to the said coil to hold the said coil against substantial movement by said article to thereby indicate the weight of the article.

5. The invention as recited in claim 4 wherein the means measuring the amount of D.-C. current applied to the said coil comprises an ammeter calibrated in terms of weight.

6. An electrical weighing apparatus comprising a permanent magnet having pole pieces for establishing a fixed magnetic flux field; means injecting a varying component of magnetic flux into the said fixed magnetic flux field; a coil rotatable between said pole pieces; an article supporting lever attached to said coil for applying a torque to the coil in one direction; means applying a D.-C. current to said coil to oppose movement thereof in the said one direction; means regulating said D.-C. current to said coil, said regulating means including said coil, the movement of which induces an A.-C. potential in said coil, by reason of the said varying component of magnetic flux; and means measuring the amount of D.-C. current applied to the said coil to hold the said coil against substantial movement by the said article to thereby indicate the weight of the article.

7. An electrical weighing device comprising a composite fixed and varying magnetic flux field, a coil rotatably positioned in the said composite fixed and varying magnetic flux field about an axis extending through the coil, an arm fixed to the said coil for supporting an article to be weighed whereby a torque is applied to the coil, which torque tends to rotate the coil from a normal position, means supplying a D.-C. current to said coil whereby an opposing torque is applied to the coil, which torque tends to return the said coil to the said normal position, means including said coil, the rotation of which induces therein an A.-C. potential by reason of the varying magnetic flux field for adjusting the amount of the said D.-C. current to the said coil, and means indicating the amount of D.-C. current necessary to maintain the said coil at substantially normal position whereby the weight of the said article is indicated.

8. An electrical torsion type balance comprising a permanent magnet having adjacent poles for establishing a stationary magnetic flux field; means injecting an alternating component of magnetic flux into the said stationary magnetic flux field; a coil in said stationary magnetic flux field and rotatable about an axis extending between said poles; a balance arm fixed to said coil for supporting an article to be weighed; means whereby the effect of the article on the balance arm is counterbalanced, said means generating a D.-C. current regulated by an A.-C. potential induced in said coil by reason of the said alternating component of magnetic flux; and means indicating the amount of D.-C. current necessary to substantially counter-balance the effect of the article on the balance arm.

References Cited in the file of this patent

UNITED STATES PATENTS

| 2,357,891 | Granberry | Sept. 12, 1944 |
| 2,486,641 | Gilbert | Nov. 1, 1949 |
| 2,620,665 | Carlisle | Dec. 9, 1952 |
| 2,650,348 | Gilbert | Aug. 25, 1953 |

FOREIGN PATENTS

| 468,642 | Italy | Jan. 28, 1952 |
| 704,248 | Great Britain | Feb. 17, 1954 |